United States Patent Office 2,916,532
Patented Dec. 8, 1959

2,916,532

NUCLEAR ALKYLATION OF AROMATIC COMPOUNDS

Louis Schmerling, Riverside, and John P. Luvisi, Park Ridge, Ill., assignors, by mesne assignments, to Universal Oil Products Company, Des Plaines, Ill., a corporation of Delaware No Drawing. Application December 28, 1956
Serial No. 631,051

16 Claims. (Cl. 260—671)

This invention relates to a process for the nuclear alkylation of aromatic compounds and more particularly to the use of a novel catalyst in said alkylation process.

It is an object of this invention to prepare nuclearly substituted alkylated aromatic compounds by condensing an aromatic compound with an alkylating agent in the presence of a novel catalyst.

A further object of this invention is to prepare nuclearly substituted alkylated aromatic compounds by condensing an alkylated aromatic compound with an alkylating agent in the presence of a novel alkylation catalyst comprising an alkali-metal aluminum hydride.

One embodiment of this invention resides in a process for the nuclear alkylation of an aromatic compound by alkylating an alkylatable aromatic compound with an alkylating agent in the presence of an alkylation catalyst consisting of an alkali metal-aluminum hydride, and recovering the resultant nuclearly alkylated aromatic compound.

A further embodiment of the invention is found in a process for the nuclear alkylation of an aromatic hydrocarbon which comprises alkylating an alkylatable aromatic hydrocarbon containing a replaceable hydrogen atom with a halogenated alkylating agent in the presence of an alkylation catalyst consisting of an alkali metal-aluminum hydride at a temperature in the range of from about 20° to about 150° C., and recovering the resultant nuclearly alkylated hydrocarbon.

A specific embodiment of the invention is found in a process for the alkylation of benzene which comprises alkylating benzene with an alkylating agent in the presence of an alkylation catalyst consisting of lithium aluminum hydride at a temperature in the range of from about 20° to about 150° C., and recovering the resultant alkylated benzene.

A more specific embodiment of the invention is found in a process for the alkylation of benzene which comprises alkylating benzene with tert-butyl chloride in the presence of lithium aluminum hydride at a temperature in the range of from about 20° to about 30° C., and recovering the resultant t-butyl benzene.

Other objects and embodiments of the invention referring to alternative aromatic compounds, alkylating agents and alkylation catalysts will be found in the following further detailed description of the invention.

It has now been discovered that nuclearly substituted aromatic compounds which may be used as intermediates in the preparation of detergents (for example, by sulfonation) pharmaceuticals, resins, fine chemicals, etc., may be prepared by condensing an aromatic compound with an alkylating agent in the presence of a novel catalyst consisting of an alkali metal-aluminum hydride such as, for example, lithium aluminum hydride, sodium aluminum hydride, potassium aluminum hydride, rubidium aluminum hydride, cesium aluminum hydride, etc.

The nuclear substitution of aromatic compounds is unexpected inasmuch as the use of an alkali metal hydride catalyst and an olefin alkylating agent results in a side chain alkylation of any aromatic compound already possessing an alkyl group on the aromatic nucleus as shown in United States Patent No. 2,769,850. However, in the process of the present invention the alkylation of an alkyl aromatic such as toluene with an alkylating agent such as tert-butyl bromide, in the presence of an alkali metal-aluminum hydride catalyst results in a tert-butyltoluene such as m-tert-butyltoluene or p-tert-butyltoluene. Not only is the resultant product different from the product obtained by the method of the prior art, but also the alkylating agent of the present invention is different, i.e., n-, sec- and tert-alkyl halides.

The condensation reaction will take place at temperatures ranging from about 20° to about 150° C. or more and at pressures ranging from atmospheric to about 100 atmospheres or more, the temperature and pressure depending upon the particular reactants selected to undergo condensation. For example, when tertiary alkyl halides are used as alkylating agents the reaction temperature will usually be lower than when secondary alkyl halides are used. Likewise the use of secondary alkyl halides as alkylating agents will usually allow the use of a lower temperature range than will be required when a primary alkyl halide is used.

Aromatic compounds which may be nuclearly alkylated by the aforementioned alkylating agents in the process of this invention are those which contain a replaceable hydrogen atom and include benzene, toluene, xylenes, 1,2,3-trimethylbenzene, etc., ethylbenzene, propylbenzenes, butylbenzenes, etc.; 1,2-diethylbenzene, 1,2,3-triethylbenzene, 1,2-dipropylbenzene, 1,3-dipropylbenzene, 1,2,3-tripropylbenzene, etc.; naphthalene, 1-methylnaphthalene, 2-methylnaphthalene, 1-ethylnaphthalene, 2-ethylnaphthalene, 1-propylnaphthalene, 2-propylnaphthalene, etc.; 1,4-dimethylnaphthalene, 1,2 - diethylnaphthalene, 1,5-dipropylnaphthalene, etc.; 1,2,3-trimethylnaphthalene, 1,2,4 - trimethylnaphthalene, 1,2,3 - triethylnaphthalene, etc.; 1,2,3,4-tetrahydronaphthalene; indene; indan, etc.; anthracene, 2-methylanthracene, 1-methylanthracene, 1-ethylanthracene, 2-ethylanthracene, 9,10-dimethylanthracene, 1,2-diethylanthracene, etc.; 9,10-dipropylanthracene, etc.; phenanthrene, 1-methylphenanthrene, 2-methylphenanthrene, etc.; 1-ethylphenanthrene, 2-ethylphenanthrene, etc.; 1,2 - dimethylphenanthrene, 1,3 - dimethylphenanthrene, 1,2-diethylphenanthrene, etc.; chrysene, 1-methylchrysene, 2-methylchrysene, 1,2-dimethylchrysene, 1,3-diethylchrysene, etc.; pyrene, 1-methylpyrene, 2-methylpyrene, etc.; 1-ethylpyrene, 2-ethylpyrene, etc.; 1,2-dimethylpyrene, etc. It is understood that the above mentioned aromatic compounds are set forth only as examples of the compounds which may be used in this process and that any aromatic compounds which will undergo alkylation in a condensation reaction with an alkylating agent may be used in the process of the present invention. This will include substituted aromatic compounds other than those enumerated above such as the phenols and halogen-substituted benzenes such as chlorobenzene, bromobenzene, dichlorobenzene, dibromobenzene, etc., and the like.

Suitable alkylating agents include primary, secondary and tertiary alkyl halides, polyhaloalkanes, halocycloalkanes, aralkyl halides, etc., the preferred halogen atoms being chlorine and bromine. Examples of alkylating agents which may be used include alkyl halides such as methyl chloride, ethyl chloride, propyl chloride, n-butyl chloride, sec-butyl chloride, isobutyl chloride, tert-butyl chloride, etc., methyl bromide, ethyl bromide, propyl bromide, n-butyl bromide, sec-butyl bromide, isobutyl bromide, tert-butyl bromide, etc.; polyhaloalkanes such as carbon tetrachloride, bromotrichloromethane, chloroform, 1,1-dichloromethane, 1,1-dichloroethane, 1,1-dibromoethane, 1,1,2-trichloroethane, 1,1,2-tribromoethane, 1,1-dichloropropane, 1,2-dichloropropane, 1,1-dibromopropane, 1,2-dibromopropane, 1,1,2-trichloropropane, 1,1,2-tribromopropane, 1,1,3,3-tetrachloropropane, 1,1,3,3-tetrabromopropane, 1,1-dichlorobutane, 1,2-dichlorobutane, 2,2-dichlorobutane, 2,3-dichlorobutane, 1,1-dibromobutane, 1,2-dibromobutane, 2,3-dibromobutane, 1,1,2-trichlorobutane, 1,1,3-tribromobutane, 1,2-dichloro-2-methylpropane, 1,2-dibromo-2-methylpropane, polychlorinated and poly-brominated pentanes, hexanes, etc.; halocycloalkanes such as chlorocyclopentane, bromocyclopentane, chlorocyclohexane, bromocyclohexane, chlorocycloheptane, bromocycloheptane, 1,2-dichlorocyclopentane, 1,2-dibromocyclopentane, 1,2-dichlorocyclohexane, 1,2-dibromocyclohexane, 1,3-dichlorocyclopentane, 1,3-dibromocyclopentane, 1,3-dichlorocyclohexane, 1,3-dibromocyclohexane, etc.; aralkyl halides such as benzyl chloride, benzyl bromide, 1-chloroethylbenzene, 1-bromoethylbenzene, 1,1-dichloroethylbenzene, 1,1-dibromoethylbenzene, etc. In addition, polyhaloalkanes, characterized by containing a quaternary carbon atom, such as those which may be obtained, for example, by the reaction of a saturated tertiary halide (i.e. a tertiary alkyl or cycloalkyl halide such as tert-butyl chloride, or 1-methyl-1-chlorocyclohexane) with a vinyl halide may also be used in this invention. These polyhaloalkanes include 1,1-dichloro-3,3-dimethylbutane, 1,1-dibromo-3,3-dimethylbutane, 1,1-dichloro-3,3-dimethylpentane, 1,1-dibromo-3,3-dimethylpentane, 1,1,2-trichloro-3,3-dimethylbutane, 1,1,2-tribromo-3,3-dimethylbutane, 1,1-dichloro-3-methyl-3-ethylpentane, 1,1-dibromo-3-methyl-3-ethylpentane, 1,1,2-trichloro-3,3-dimethylpentane, 1,1,2-tribromo-3,3-dimethylpentane, 1,1-dichloro-3,3-diethylpentane, 1,1-dibromo-3,3-diethylpentane, 1,1,2-trichloro-3,3-diethylpentane, 1,1,2-tribromo-3,3-diethylpentane, 1,1-dichloro-3,3-dimethylhexane, 1,1-dibromo-3,3-dimethylhexane, 1,1,2-trichloro-3,3-dimethylhexane, 1,1,2-tribromo-3,3-dimethylhexane, 1,1-dichloro-3,3-diethylhexane, 1,1-dibromo-3,3-diethylhexane, 1,1,2-trichloro-3,3-diethylhexane, 1,1,2-tribromo-3,3-diethylhexane, 1,1-dichloro-4,4-dimethylpentane, 1,2-dichloro-4,4-dimethylpentane, 1,2,3-trichloro-4,4-dimethylpentane, 1,1-dibromo-4,4-dimethylpentane, 1,2-dibromo-4,4-dimethylpentane, 1,1-dichloro-4-methyl-4-ethylpentane, 1,1-dibromo-4-methyl-4-ethylpentane, 1,1-dichloro-4,4-dimethylhexane, 1,1-dichloro-5,5-dimethylhexane, 1,1-dibromo-4,4-dimethylhexane, 1,2-dibromo-3,3-dimethylhexane, 1,2-dichloro-3,3-dimethylhexane, etc. For the purposes of this specification and claims these mono- and polyhalogenated hydrocarbons will be referred to as halogenated alkylating agents.

The process of this invention may be effected in any suitable manner and may comprise either a batch or a continuous type operation. When a batch type operation is used, a quantity of the starting material, namely the alkylating agent and the aromatic hydrocarbon are gradually added to the mixture of aromatic hydrocarbon and the catalyst in a suitable reaction vessel provided with stirring means. The vessel is heated to the desired temperature depending upon the reactants and catalyst used, and maintained thereat for a predetermined residence time. After the reaction time has elapsed, the vessel and contents thereof are allowed to cool to room temperature, the desired reaction product is separated from the catalyst layer and recovered from an unreacted starting material and/or undesired side reactions by conventional means, for example, by washing, drying and fractional distillation.

Another method by which the process of this invention may be effected is a continuous type operation. A particularly suitable type of continuous operation comprises a fixed bed type in which the alkylation catalyst is disposed as a bed in a reaction zone, said zone being maintained at suitable operating conditions of temperature and pressure. The aromatic compound and alkylating agent are continuously admitted to said zone through separate streams or, if so desired, may be admixed prior to entry into said zone and charged thereto in a single stream. The reactants are then passed through said zone in either upward or downward flow. Alternatively a mixture of aromatic compound and catalyst in one stream and the alkylating agent, dissolved, if so desired, in the aromatic compound in another stream are introduced into the reaction zone. The alkylation of the aromatic compound is continued until the desired reaction time has elapsed after which the reaction product will be continuously withdrawn from the reaction zone, the liquid products separated from the catalyst and subjected to fractional distillation to yield the desired reaction product, unreacted alkylating agent and aromatic compound, the latter two being recycled for use as a portion of the starting material while the alkylated aromatic compound is withdrawn and purified by conventional means hereinbefore set forth. The reaction zone in which the alkylation reaction takes place may comprise an unpacked vessel or coil or it may contain a solid adsorbent such as fire brick, alumina, dehydrated bauxite and the like. In addition to the above mentioned types of continuous process, a compact moving bed type of operation in which the reactants and the catalysts are passed through said reaction zone either concurrently or countercurrently to each other, may also be used.

The following examples are given to illustrate the process of this invention which, however, are not intended to limit the generally broad scope of the present invention in strict accordance therewith.

Example I

A mixture of 20 g. (0.25 mole) of benzene, 11 g. (0.12 mole) of tert-butyl chloride and 2.4 g. (0.063 mole) of lithium aluminum hydride was placed in a reaction vessel provided with a soda-lime tower in the exit line. The mixture was allowed to stand at room temperature for a period of about one hour during which time hydrogen chloride was evolved, the aforementioned soda-lime tower showing a gain of 3.5 in weight. At the end of this time the reaction product was treated with ethyl alcohol to decompose the lithium aluminum hydride catalyst; a vigorous reaction occurring, accompanied by the liberation of hydrogen and the formation of a gel. Hydrochloric acid was added to the solution after which the reaction product layer was separated from the hydrochloric acid layer. The former was washed with water, dried and subjected to fractional distillation. 10 g. (0.075 mole) of pure tert-butylbenzene boiling at 170° C. was separated therefrom. The 10 g. thus obtained represented 63% of the theoretical yield.

Example II

A mixture comprising 20 g. (0.25 mole) of benzene, 16 g. (0.12 mole) of tert-butyl bromide and 2.4 g. (0.063 mole) of lithium aluminum hydride was treated in a manner similar to that set forth in Example I above. The reaction product obtained thereby was also subjected to fractional distillation and 10 g. of tert-butyl benzene comprising a 63% yield was obtained thereby.

Example III 20 g. of benzene, 16 g. of sec-butyl bromide and 2.4 g. of lithium aluminum hydride were heated at a temperature of about 95° C. in a flask connected to a reflux condenser. The reaction mixture was maintained at this temperature for approximately 1 hour after which time the vessel and contents thereof were cooled to room temperature. The mixture was treated with alcohol to decompose the lithium aluminum hydride after which the resulting mixture was treated with hydrochloric acid. The benzene solution was separated from the remainder of the mixture, washed with water, dried and subjected to fractional distillation. 6 g. of sec-butylbenzene boiling at 173° C. and representing a 38% yield of the theoretical amount was obtained from this distillation along with minor proportions of di-sec-butylbenzene and higher alkylate.

*Example IV*

20 g. of benzene, 16 g. of n-butyl bromide and 2.4 g. of lithium aluminum hydride were weighed into a glass liner which was then sealed into a rotating autoclave of 850 cc. capacity. The autoclave was pressured with 30 atmospheres of nitrogen and then was heated to a temperature in the range of 130–138° C. for approximately 5.5 hours, after which the vessel and contents thereof were cooled to room temperature. The reaction mixture was treated in the manner as hereinbefore set forth in Example I above, said distillation resulting in a yield of 38% butylbenzene, chiefly sec-butylbenzene.

*Example V*

25 g. (0.25 mole) of toluene, 11 g. (0.12 mole) tert-butyl chloride and 2.4 g. (0.063 mole) of lithium aluminum hydride was placed in a reaction vessel similar to that described in Example I. The mixture was allowed to stand at room temperature for a period of about one hour. At the end of this time the reaction product was treated with ethyl alcohol to decompose the catalyst, a vigorous reaction occurring, accompanied by the liberation of hydrogenation and the formation of a gel. Hydrochloric acid was added to the solution after which the reaction product layer was separated from the hydrochloric acid layer. The former was washed with water, dried and subjected to fractional distillation. The desired reaction comprising a mixture of 60% m-tert-butyltoluene and 40% p-tert-butyltoluene was separated therefrom.

We claim as our invention:

1. A process for the nuclear alkylation of an aromatic compound which comprises alkylating an alkylatable aromatic compound with a halogenated alkylating agent in the presence of an alkylation catalyst consisting of an alkali metal-aluminum hydride, and recovering the resultant nuclearly alkylated aromatic compound.

2. A process for the nuclear alkylation of an aromatic hydrocarbon which comprises alkylating an alkylatable aromatic hydrocarbon containing a replaceable hydrogen atom with a halogenated alkylating agent in the presence of an alkylation catalyst consisting of an alkali metal-aluminum hydride, and recovering the resultant nuclearly alkylated hydrocarbon.

3. A process for the nuclear alkylation of an aromatic hydrocarbon which comprises alkylating an alkylatable aromatic hydrocarbon containing a replaceable hydrogen atom with a halogenated alkylating agent in the presence of an alkylation catalyst consisting of an alkali metal-aluminum hydride at a temperature in the range of from about 20° to about 150° C., and recovering the resultant nuclearly alkylated hydrocarbon.

4. A process for the nuclear alkylation of an aromatic hydrocarbon which comprises alkylating an alkylatable aromatic hydrocarbon containing a replaceable hydrogen atom with a halogenated alkylating agent in the presence of an alkylation catalyst consisting of lithium aluminum hydride at a temperature in the range of from about 20° to about 150° C., and recovering the resultant nuclearly alkylated hydrocarbon.

5. A process for the nuclear alkylation of an aromatic hydrocarbon which comprises alkylating an alkylatable aromatic hydrocarbon containing a replaceable hydrogen atom with a halogenated alkylating agent in the presence of an alkylation catalyst consisting of sodium aluminum hydride at a temperature in the range of from about 20° to about 150° C., and recovering the resultant nuclearly alkylated hydrocarbon.

6. A process for the nuclear alkylation of an aromatic hydrocarbon which comprises alkylating an alkylatable aromatic hydrocarbon containing a replaceable hydrogen atom with a halogenated alkylating agent in the presence of an alkylation catalyst consisting of potassium aluminum hydride at a temperature in the range of from about 20° to about 150° C., and recovering the resultant nuclearly alkylated hydrocarbon.

7. A process for the alkylation of benzene which comprises alkylating benzene with a halogenated alkylating agent in the presence of an alkylation catalyst consisting of lithium aluminum hydride at a temperature in the range of from about 20° to about 150° C., and recovering the resultant alkylated benzene.

8. A process for the alkylation of toluene which comprises alkylating toluene with a halogenated alkylating agent in the presence of an alkylation catalyst consisting of lithium aluminum hydride at a temperature in the range of from about 20° to about 150° C., and recovering the resultant alkylated toluene.

9. A process for the nuclear alkylation of an aromatic hydrocarbon which comprises alkylating an alkylatable aromatic hydrocarbon containing a replaceable hydrogen atom with an alkylating agent selected from the group consisting of n-alkyl halides, sec-alkyl halides, tert-alkyl halides, polyhaloalkanes, halocycloalkanes and aralkyl halides, in the presence of an alkylation catalyst consisting of lithium aluminum hydride at a temperature in the range of from about 20° to about 150° C., and recovering the resultant nuclearly alkylated hydrocarbon.

10. A process for the nuclear alkylation of an aromatic hydrocarbon which comprises alkylating an alkylatable aromatic hydrocarbon containing a replaceable hydrogen atom with tert-butyl chloride in the presence of an alkylation catalyst consisting of lithium aluminum hydride at a temperature in the range of from about 20° to about 150° C., and recovering the resultant nuclearly alkylated hydrocarbon.

11. A process for the nuclear alkylation of an aromatic hydrocarbon which comprises alkylating an alkylatable aromatic hydrocarbon containing a replaceable hydrogen atom with 1,1-dichloroethane in the presence of an alkylation catalyst consisting of lithium aluminum hydride at a temperature in the range of from about 20° to about 150° C., and recovering the resultant nuclearly alkylated hydrocarbon.

12. A process for the nuclear alkylation of an aromatic hydrocarbon which comprises alkylating an alkylatable aromatic hydrocarbon containing a replaceable hydrogen atom with carbon tetrachloride in the presence of an alkylation catalyst consisting of lithium aluminum hydride at a temperature in the range of from about 20° to about 150° C., and recovering the resultant nuclear alkylated hydrocarbon.

13. A process for the alkylation of benzene which comprises alkylating benzene with tert-butyl chloride in the presence of an alkylation catalyst consisting of lithium aluminum hydride at a temperature in the range of from about 20° to about 30° C., and recovering the resultant t-butyl benzene.

14. A process for the alkylation of benzene which comprises alkylating benzene with sec-butyl chloride in the presence of an alkylation catalyst consisting of lithium aluminum hydride at a temperature in the range of from about 80° to about 100° C., and recovering the resultant sec-butylbenzene.

15. A process for the alkylation of benzene which comprises alkylating benzene with n-butyl chloride in the presence of an alkylation catalyst consisting of lithium aluminum hydride at a temperature in the range of from about 100° to about 150° C., and recovering the resultant butylbenzene.

16. A process for the alkylation of toluene which comprises alkylating toluene with tert-butyl chloride in the presence of an alkylation catalyst consisting of lithium aluminum hydride at a temperature in the range of from about 20° to about 30° C., and recovering the resultant tert-butyltoluene.

References Cited in the file of this patent

UNITED STATES PATENTS

| | | |
|---|---|---|
| 2,295,608 | Ruthruff | Sept. 15, 1942 |
| 2,357,978 | Schmerling et al. | Sept. 12, 1944 |
| 2,771,495 | Pines et al. | Nov. 20, 1956 |
| 2,780,660 | Field et al. | Feb. 5, 1957 |
| 2,823,240 | Field et al. | Feb. 11, 1958 |